United States Patent [19]
Phillips

[11] Patent Number: 6,131,363
[45] Date of Patent: Oct. 17, 2000

[54] GREENHOUSE ROOF GLAZING SYSTEM

[75] Inventor: Robert D. Phillips, Greeley, Colo.

[73] Assignee: Innovative Greenhousing Systems, Inc., Atlanta, Ga.

[21] Appl. No.: 09/045,598

[22] Filed: Mar. 20, 1998

[51] Int. Cl.$^7$ ..................................................... E04B 9/32
[52] U.S. Cl. ........................ 52/786.11; 52/173.3; 47/17; 359/595; 362/351
[58] Field of Search ................................. 52/786.11, 18, 52/173.3; 359/591, 595, 596; 362/145, 147, 351, 360; 47/17, 19

[56] References Cited

U.S. PATENT DOCUMENTS

| | | | |
|---|---|---|---|
| 3,443,860 | 5/1969 | Luboshez | 359/596 |
| 4,035,539 | 7/1977 | Luboshez | 428/178 |
| 4,068,423 | 1/1978 | Marsh . | |
| 4,076,015 | 2/1978 | Mattson | 126/687 |
| 4,077,393 | 3/1978 | Mattson | 126/709 |
| 4,147,002 | 4/1979 | Kautz . | |
| 4,209,222 | 6/1980 | Posnansky . | |
| 4,210,128 | 7/1980 | Mattson | 126/678 |
| 4,217,742 | 8/1980 | Evans | 52/533 |
| 4,242,833 | 1/1981 | Maes, Jr. . | |
| 4,586,297 | 5/1986 | Tagiasco . | |
| 5,261,184 | 11/1993 | Appeldorn et al. . | |
| 5,519,964 | 5/1996 | Kujirai et al. . | |
| 5,524,381 | 6/1996 | Chahroudi . | |
| 5,585,418 | 12/1996 | Nagata . | |

*Primary Examiner*—Beth A. Stephan
*Assistant Examiner*—Brian E. Glessner
*Attorney, Agent, or Firm*—Todd Deveau; Troutman Sanders, LLP

[57] ABSTRACT

A commercial greenhouse roof and roof glazing system that maximizes the intake of direct winter sunlight while managing spring, summer and fill sunlight to similar levels so that continuous produce and other crops can be grown. This system has transparent corrugated roofing sheets with north and south facing sections running in an east/west direction, where portions of the outer face of the outer glazing sheet are coated, insulation separates each sheet at locations of top surface coating, gas spaces separate each sheet at locations of no coating, and reflective material coats the interior surface of the interior sheet at portions of insulation. This system has no moving parts other than the movement of the sun in relationship to the structure. The color of the sunlight spectrum is split in the summer months so that the photosynthetic active portion is maximized in summer months leaving the unwanted summer heat gain outside of the structure. Since all of the light is taken in through the roof the walls can be of conventional architectural materials which allows the total growing facility to be placed at grade level or on the top floor of urban area buildings. This eliminates the need for much of the packing and fossil fuel-run distribution systems that typical growing facilities endure.

20 Claims, 6 Drawing Sheets

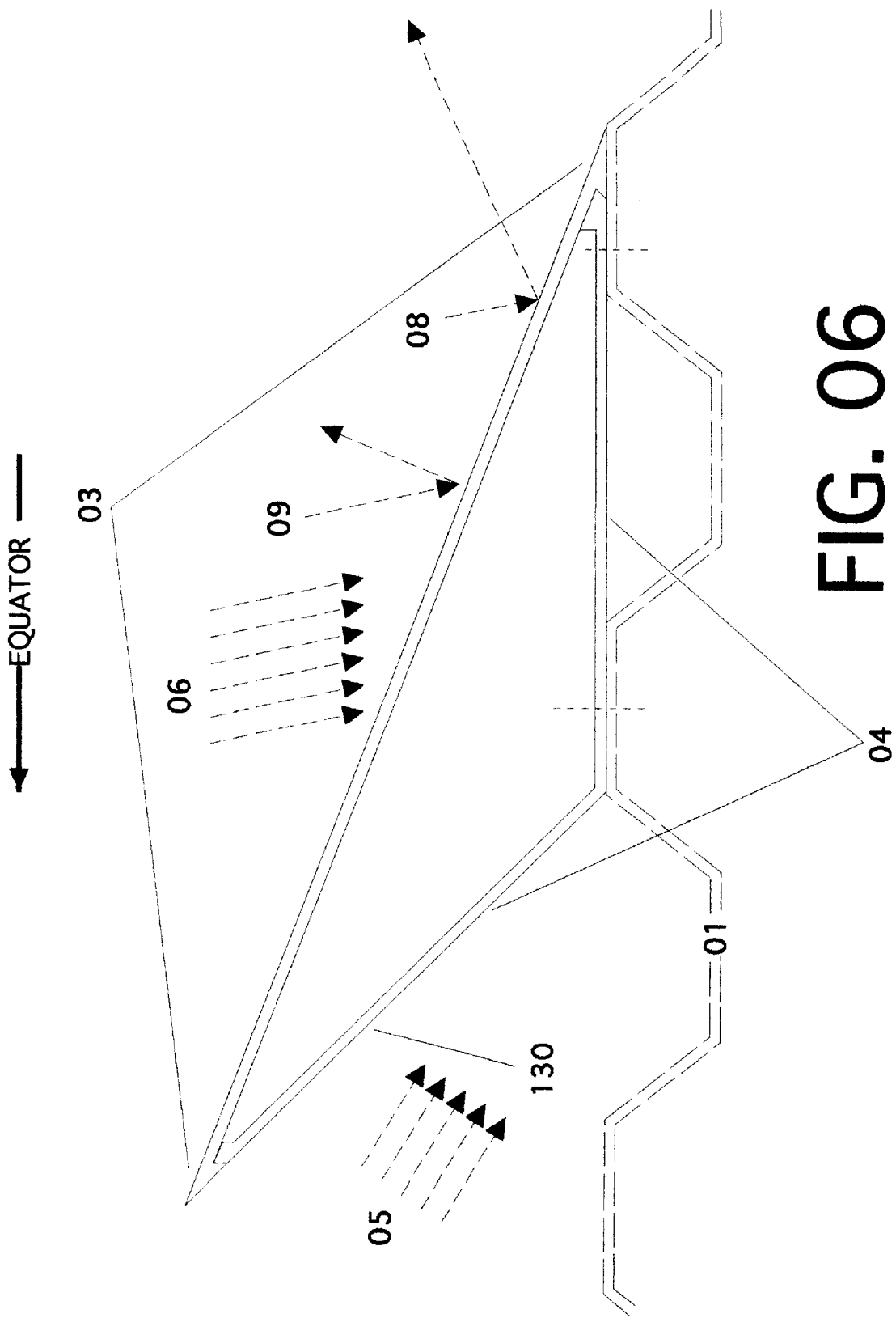

GREENHOUSE ROOF GLAZING SYSTEM

BACKGROUND OF THE INVENTION

1. Field of the Invention

This invention relates generally to an improved roofing system. In particular, this invention relates to a well-insulated commercial greenhouse range roof glazing system without moving parts that externally maximizes the collection of fill spectrum winter sunlight while externally managing the summer sunlight input to similar levels while further factoring out potions of the light spectrum not vital for photosynthesis.

2. Description of Related Art

Primarily, greenhouses shield plants from the weather. Plants generally require five separate building related factors for growth. These factors are humidity, temperature, carbon dioxide, light and atmospheric pressure. Should variations in any one of these factors stray outside acceptable levels for a significant period of time, a plant may die.

Traditional greenhouse construction can only control some, but not all of these factors. When the present invention is incorporated in an appropriately designed greenhouse, all of these factors can be controlled.

Traditional greenhouses are typically located far from urban consumption centers, whereas the roofing system of the present invention enables greenhouses to be located closer to consumers, and, therefore, eliminates several links in the distribution chain, thus reducing labor, transportation, and spoilage costs. Further, the present invention enables several structures to be in close proximity to one another, something conventional greenhouse designs does not allow.

Several configurations of greenhouse and roof design are known. These disclosures suffer from numerous disadvantages, which are overcome by the present invention. For example, U.S. Pat. No. 5,261,184 to Appeldorn et al., discloses an internal optical system for a free standing greenhouse. Appeldorn et al. allows more light into the greenhouse in summer than in winter. This optical system is located inside of the structure and, therefore, does not control the amount of light energy that the plants require, or that the building has to deal with for heating and cooling. This is not the case with the present invention's design. Further, a greenhouse utilizing this type of optical system must be free standing and separated from other greenhouses, because structures were placed together, the ridgeline of one building would cause a shadow on the next building's glazed area. Utilizing Appeldorn et al.'s design requires the construction of more exterior walls, each wall having heat loss and gain, than the present invention.

U.S. Pat. No. 4,068,423 to Marsh, discloses simplified greenhouse assemblies designed to be field assembled from several subassemblies. In relation to solar radiation, the combined roof and sidewall structure is constructed of transparent corrugated fiberglass sheeting or panels with longitudinally aligned corrugations. Marsh discloses assemblies more typical of hobby house scale, unlike the commercial system of the present invention. Further, the walls and roof disclosed are of single glazing material which can not control heat loss and gain sufficiently to economically heat in winter and cool in summer. Another disadvantage is that the opening of the Marsh roof for ventilation does not allow for insect control.

U.S. Pat. No. 4,147,002 to Kautz, discloses a light valve system comprising spaced-apart sheets arranged to define a cavity therebetween. The sheets are formed from a light-transmitting material whereby light is transmitted through the cavity from one side to the other. Particulate material is conveyed in and out of the cavity to alter the light transmission through the cavity from one side to the other. The particulate material may be opaque or translucent depending on the degree of light restriction desired. The light valve system of Kautz is very dependent on electric controls, motors and mass movement of insulating particles. The time that it takes to fill and empty the cavities with this type of insulation appears to take longer than the time it would take for cloud cover to shade, and unshade, the greenhouse.

U.S. Pat. No. 4,209,222 to Posnansky, discloses an installation for utilizing solar energy, of the type having a plurality of reflectors capable of tracking the position of the sun for focusing the solar rays on at least one operative region.

U.S. Pat. No. 4,242,833 to Maes, Jr., discloses a method and apparatus for a greenhouse using a water layer disposed on the ceiling of the greenhouse such that the impinging solar radiation passes through the layer prior to passing into the interior of the enclosure. The water layer is contiguous to and partially defines the interior of the enclosure, such that the volume of water acts as a thermal storage medium. Relatively long wavelength infrared radiation is absorbed in the water while allowing passage of photosynthetic spectral regions of the solar radiation. Maes, Jr. also discloses assemblies of hobby house scale. If Maes, Jr. structures were connected together, the roofline of one building would shade the next building in the winter. Additionally, the water layer is horizontal and reflects the low winter sunlight off of the top surface of the ceiling to be reflected again by the underside of a movable reflector. The light would then exit the building through the curved glazing. This amounts to as much as 40% of the available sunlight. The winter light that strikes the underside of the movable reflector first will then be reflected back outside of the greenhouse after being reflected off of the surface of the water layer.

U.S. Pat. No. 4,586,297 to Tagiasco, discloses a greenhouse having a roof in the form of flat panels provided with regularly spaced undulations. The panels are made of a transparent plastic material, preferably polyester. The undulations are asymmetrical, and the panels are set up in such a way that that greater slope, i.e., the least inclined, is directed southward. Yet, this device does not control the amount of sunlight entering the structure. There would be over twice as much light in the summer as in the winter. Since the roof opens it can not protect the plants from insects, other plant pollen and weed seeds. Further, the thermal insulation characteristics are not adequate for economical heating and cooling.

U.S. Pat. No. 5,519,964 to Kujirai et al., discloses a composite plastic film and a greenhouse built with that film as a light-transmitting covering sheet material. The transparent or translucent plastic material film is a double-layered composite film consisting of a substrate film and a overlayer characterized in terms of the relative values of two parameters including the total heat volume and the absorbtivity of radiation heat. Although this single membrane may modify the radiant heat gain/loss characteristics, it does little to stop the heat gain/loss due to conduction. Control of this conduction is critical at night when outdoor temperatures are low.

U.S. Pat. No. 5,524,381 to Chahroudi, discloses a building having a series of multi-layered solar collectors comprising a layer of a transparent glazing material at the outer most surface of the multi-layer solar collector, a layer of a transparent insulation material, a layer of optical shutter and a heat storage element. Yet the top exterior surface of this glazing system is flat so that depending on the slope and orientation of the roof, there will be sunlight striking this surface below the critical angle in the winter. This would account for up to 40% of the initial sunlight being reflected back up into the sky.

U.S. Pat. No. 5,585,418 to Nagata, discloses a thermoplastic greenhouse film having an outer layer with a variable light-diffuse surface wherein the film is clear to impinging sunlight on temperate days but which darkens on the effect of high, direct sunshine in order to prevent excess heat build-up within the greenhouse. The top surface of this system is also flat and therefore will also reflect up to 40% of the low angled sunlight back up to the sky. If buildings are connected together, and the gutters are running East/West, then the roof of one building would also shade the next building in the winter. Further, 100% of this type of roof has the heat loss of single or double glazing systems.

Unlike the operation of a conventional greenhouse, instead of using fuel such as electricity or fuel oil for constant operations, greenhouses comprising the present invention operate primarily on energy from sunlight. Compared to conventional greenhouses, the present system can result in savings of as much as 90% in fuel costs. In addition to the advantage of significant savings in fuel costs, the present roof glazing system also results in up to four times the productivity of conventional greenhouses. It is completely natural and relies on no chemicals whatsoever.

The present invention aids in providing growing climates for the production of produce and other plants. This system is better suited than the mainstream reliance on chemical pesticides, chemical herbicides, plant genetics, plant rotation and transportation.

Thus, it can be seen that there is a need for a well-insulated commercial greenhouse roof glazing system that integrally maximizes the collection of full spectrum winter sunlight while managing the summer sunlight input levels while further factoring out portions of the light spectrum not vital for photosynthesis, without the requirement that the present system be capable of movement, for example, solar tracking.

BRIEF SUMMARY OF THE INVENTION

The present invention relies on the premises that sunlight is provided in quantifiable amounts to the major populated areas of the earth, and that the proper proportioning of the architectural elements of a greenhouse can provide the known five separate building related factors for growth of any species of plant. The power of the sun is used not only for the photosynthesis of the plants, but also to maintain all five growing requirements which are temperature, relative humidity, light, carbon dioxide and atmospheric pressure.

Briefly, each plant has a range of day-time and night-time temperatures that is required for growth and the setting on of flowers. Conventional greenhouses have mechanical systems and structural systems that make the maintenance of this proper range impractical. The roofing system of the present invention is proportioned so that the requirements for heating and cooling can be maintained, reducing the reliance on fossil fuel-burning furnaces and cooling devices.

Further, each plant has light requirements for intensity and length of daylight hours. The intensity is controlled by proportioning the glazed areas of the present invention. The length of daylight hours can, if necessary, be controlled with blackout devices over the glazing areas of the present invention, accounting for approximately 20% to 50% of the roof. Typical greenhouses have total roof and wall areas that would have to receive blackout devices.

Briefly described, in a preferred form, the present invention overcomes several disadvantages in conventional greenhouse construction by providing a well-insulated commercial greenhouse range roof glazing system that integrally maximizes the collection of full spectrum winter sunlight while managing the summer sunlight input levels while further factoring out portions of the light spectrum not vital for photosynthesis, without the requirement that the present system be capable of movement, for example, solar tracking.

In that the present invention provides its many advantages integrally, no other optical aiding devices are required in the construction of a greenhouse incorporating the present invention. That is, no apparatus or device external or internal to the present roofing system is needed. For example, the Appledorn et al. device is an optical system inside a greenhouse (inside the light-transmitting roof panel), not integral with the roofing system.

In a preferred form, the present invention comprises three transparent corrugated roofing sheets with north and south facing sections and running in an east/west direction, wherein (a) portions of the outer face of the outer glazing sheet are coated, (b) insulation separates each sheet at locations of top surface coating, (c) air spaces separate each sheet at locations of no coating, and (d) reflective material coats the interior surface of the interior sheet at portions of insulation. In this configuration, the winter sun's rays strike the glazing at as near to normal to south facing sections as possible. Special corrugated constructions optimize the receipt of light while maximizing the insulating qualities of the total system.

It should be noted that directional terms used herein, i.e., south facing or north facing, apply to locations in the northern hemisphere. Said terms would be reversed in the southern hemisphere.

Preferably, the portions including south facing sections of the present invention are transparent, while the portions including north facing sections comprise insulation and coating. The coating comprises a colored glossy magenta coating, which is placed on north facing portions of the outer surface of the outer sheet. Reflective or glossy white coating is located on the underside of the north facing portions of the roofing system. Other embodiments of the present invention comprise a retrofit louver that provides the above principles, and louvers that are integral with a triple glazing extrusion.

By having a glossy magenta-colored outer surface above the insulated portions of the system, the winter, spring and fall sunlight is reflected from this colored surface into the transparent portion (south facing) with virtually all of the visible light spectrum in tact, due to the low angle at which the primary rays strike the glossy magenta. Additionally, the high-angled summer sunlight has the cyans and yellows absorbed, with the magenta portion of the spectrum reflected into the structure through the transparent portion of the system. This maximizes the portion of the light spectrum that is used most in photosynthesis, and keeps that portion of the light spectrum that would produce unwanted summer heat on the outside of the structure.

The underside of the insulated portion of the system reflects both light and heat that are radiating from interior surfaces back inside the greenhouse, and down to the plants and other objects within the structure.

The walls of a greenhouse comprising the present invention may be opaque and, therefore, can be constructed of materials such as masonry, stucco, wood, marble or concrete. This enables the growing facility utilizing the present glazing system to fit into a typical commercial or industrial building area. This being the case, produce and other plants can be grown with the present invention within walking distance of the restaurants, stores or shops where they will be consumed or sold. Packing, shipping, logging, handling and storing of the harvested plants is therefore reduced. The time from picking to consuming is shortened, and is beneficial for freshness. Further, waste due to damaged products is greatly reduced. The consumer also can readily see where the plants are grown and the conditions of their growth.

Since all of the walls of a greenhouse can be opaque utilizing the present invention, the walls can also be architecturally blended with surrounding buildings. The total growing facility can, therefore, be located in urban areas where the produce can be consumed locally without the typical packing and shipping labor and costs associated with typical greenhouse operation.

Accordingly, it is an object of the present invention to provide a well-insulated commercial greenhouse roof glazing system that integrally maximizes the collection of fill spectrum winter sunlight while managing the summer sunlight input levels while further factoring out portions of the light spectrum not vital for photosynthesis, without the requirement that the present system be capable of movement, for example, solar tracking.

It is a further object of the present invention to provide a glazing system which optimizes the receipt of sunlight during summer, fall, winter and spring sunlight conditions.

It is another object of the present invention to provide a glossy magenta-colored outer surface to portions of a roof system of a conventional commercial greenhouse which maximizes the portion of the sunlight spectrum that is used most in photosynthesis, and keeps that portion that would produce unwanted summer heat on the outside of the structure.

It is an additionally object of the present invention to provide a roof glazing system that enables a greenhouse to have opaque walls, which walls, therefore, can be architecturally blended with the surrounding buildings.

These and other objects, features, and advantages of the present invention will become more apparent upon reading the following specification in conjunction with the accompanying drawing figures.

BRIEF DESCRIPTION OF THE DRAWINGS

FIG. 6 is a side view of louvers for retrofitting existing glazed greenhouse that have their gutters and ridges running north/south.

DETAILED DESCRIPTION OF THE PREFERRED EMBODIMENT

Figure 1:
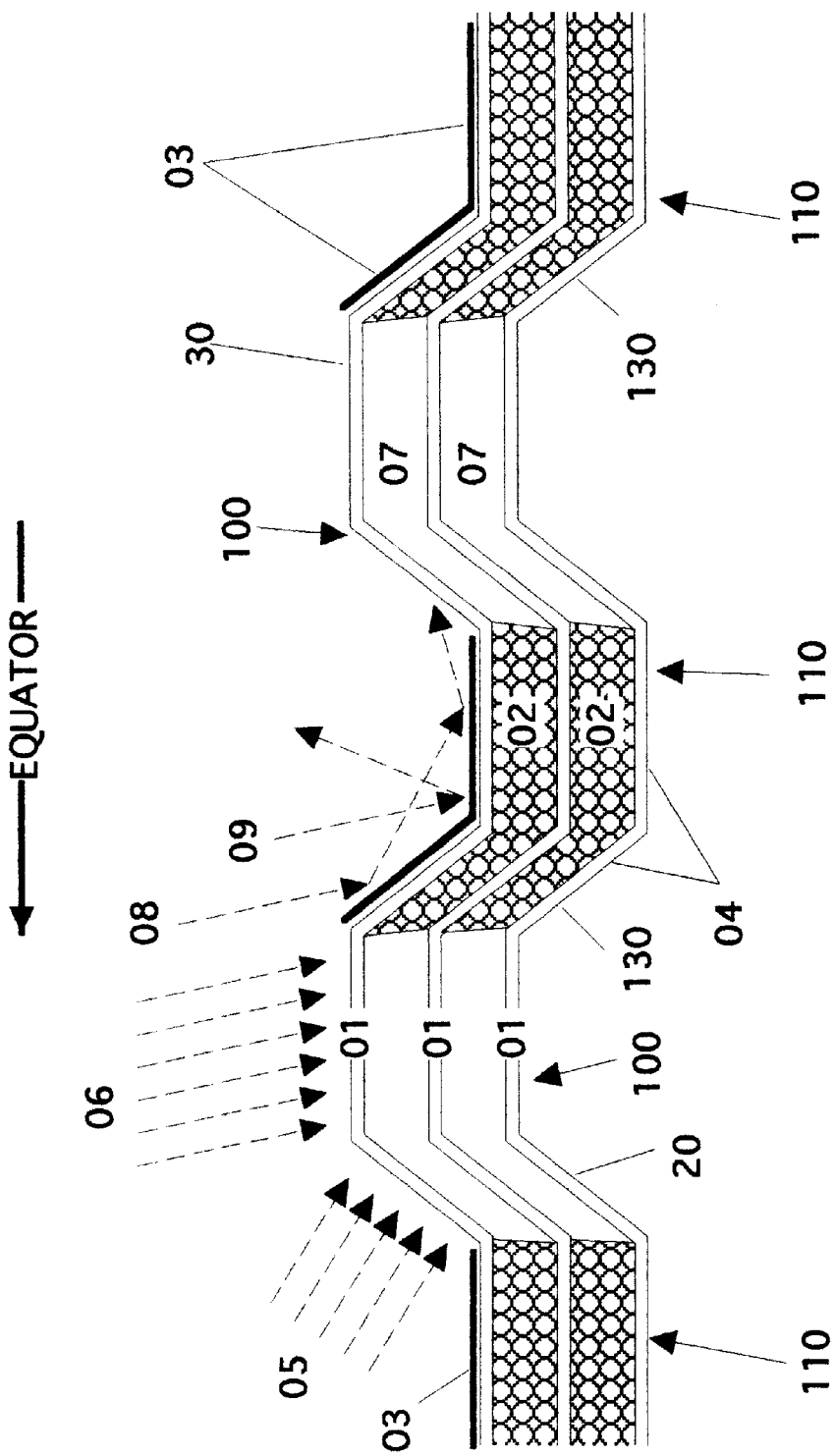
FIG. 1 is a north/south cross-section of a triple glazed roofing system of the present invention, wherein the glazing sheets are of a typically sharp cornered corrugated configuration.

Referring now in detail to the drawing figures, wherein like reference numerals represent like parts throughout the several views, the present invention preferably comprises glazing sheets 1, having transparent portions 100 and opaque portions 110.

Figure 2:
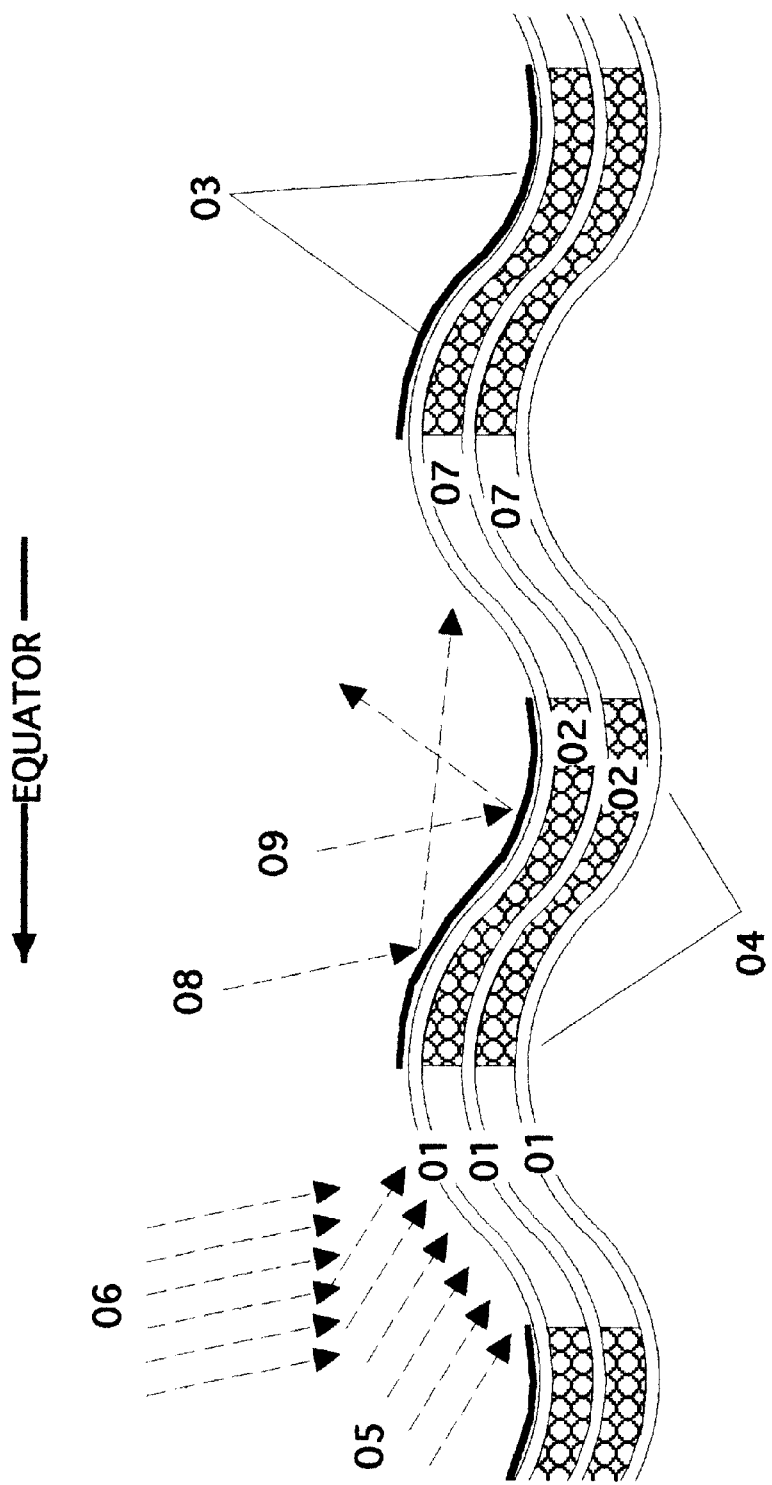
FIG. 2 is a north/south cross-section of a triple glazed roofing system wherein the glazing sheets are of a typical rounded cornered corrugated configuration.
Figure 3:
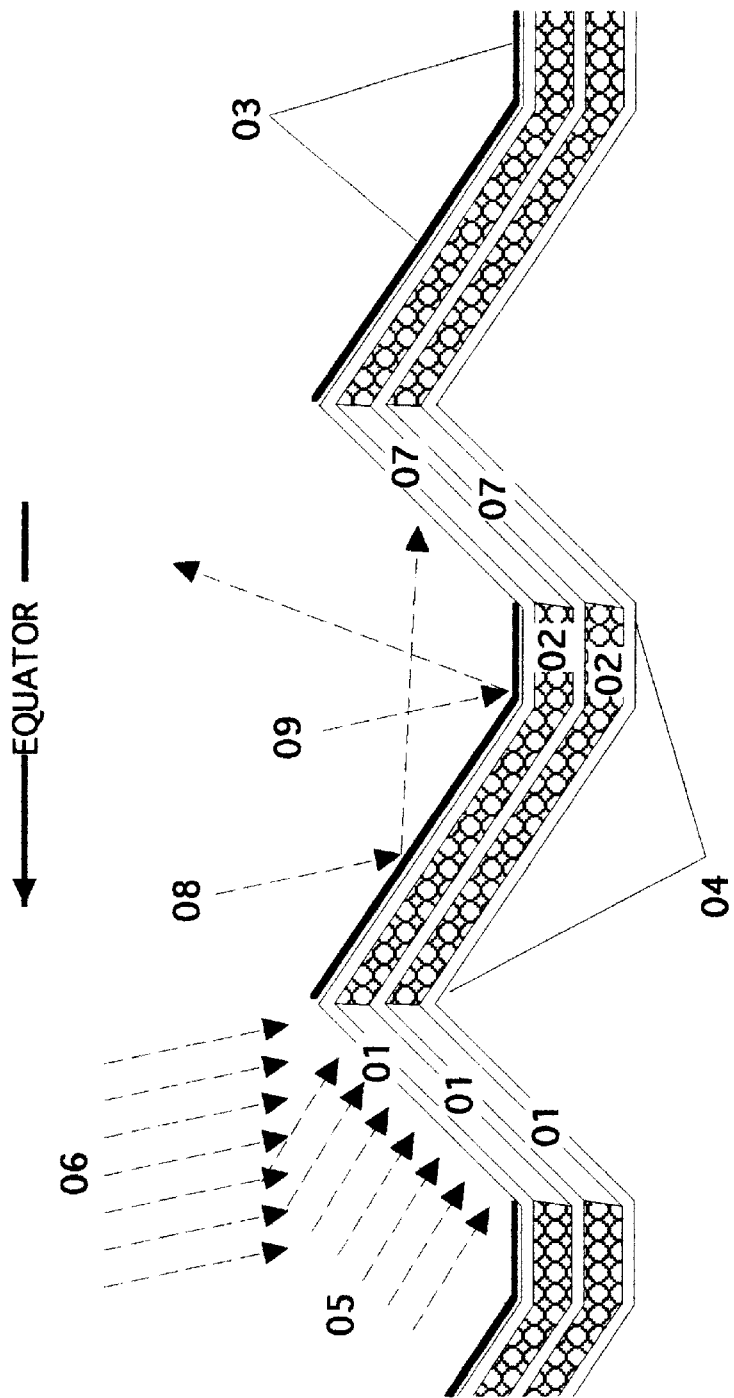
FIG. 3 is another embodiment of the view of FIG. 1.

Preferably, the present roofing system comprises three sheets 1. As shown in FIGS. 1–3, the glazing sheets 1 are transparent and of a typical sharp cornered corrugated configuration. The glazing sheets 1 can be of ultraviolet light-stabilized fiberglass reinforced plastic, ultraviolet light-stabilized polycarbonate or any other weather-resistant transparent glazing material. The surfaces of the glazing sheets 1 may be smooth or textured as long as transparency is maintained. The height, pitch and thickness can vary to meet structural attributes needed to meet span and load requirements.

Alternatively, the present invention may comprise one or two sheets 1, instead of three sheets 1, if heat gain and loss loads are satisfied.

FIG. 1 shows the three layers 1 as a typical sharp bend corrugated type. FIG. 2 shows the three layers 1 as a typical round-bend corrugated type. FIG. 3 shows a more efficient sharp-bend corrugated type.

The present invention further comprises transparent portions 100 and opaque portions 110. The transparent portions 100 of the system are oriented to maximize the entry of low-angled winter sunlight 5 as normal to the sheets 1 as possible. The portion of the system that is not critical in receiving direct winter sunlight 5, the opaque portion 110, is insulated to maximize heat retention within the structure. The opaque portions 110 have a glossy magenta coat or glaze 3 on the outer face 30 of top sheet 1 of the roofing system. Portions 110 further include a reflective coating 130 on the underside 4 of sheet 20. All materials are ultraviolet light-stabilized and of materials that do not support rotting.

The transparent portions 100 have both south facing sections and flat sections, and the opaque portions 110 have both north facing sections and flat sections.

The transparent portions 100 of the present invention are those portions of the roofing system having south facing sections and having air or gas spaces 7 between each sheet 1. As shown in FIGS. 1, 2, 3, and 5, the air or gas spaces 7 between the glazing sheets 1 establish a thermal barrier. Preferably, each space 7 is from ¼" to ⅝" between the sheets 1. If only one sheet 1 is used, and, therefore no air space, the R-factor is approximately 0.75 (U=1.33 btu/square foot, degree Fahrenheit, hour). If two sheets 1 and one air space 7 across the depth of the roof glazing system are used, the R-factor is about 1.50 (U=0.67). If three sheets 1 and two air spaces 7 across the depth of the roof glazing system are used, the R-factor is approximately 2.25 (U=0.44).

The opaque portions 110 of the present invention are those portions of the roofing system having north facing sections and comprising insulation 2 between each sheet 1. Further, opaque portions 110 include coating 3 and reflective material 130. The insulation 2 that separates the sheets 1 in the opaque portions 110, as shown in FIGS. 1, 2 and 3, preferably should be from ¼" to ⅝" thick. The thermal insulating value will vary as to thickness of the insulation material 2. The insulation material 2 is stabilized or inert so as not to support decay or breakdown from sunlight. The width of the insulation 2 can vary to respond to the required winter and summer months' light requirements of the plants and other interior space lighting needs. The R-factor for each insulation layer 2 is generally about 6 (U=0.167 btu/square foot, degree Fahrenheit, hour). It will be obvious to one skilled in the art that the R-factors may be modified outside the ranges indicated as preferable.

As shown in FIGS. 1, 2 and 3, the top surface 30 of the glazing sheet 1 above the insulation 2 or, the top surface 30 of the top insulation 2, is magenta (for example, Benjamin Moore & Co. Industrial Maintenance Coatings, International Red 23 or matching color) in color and glossy. This can be ultraviolet light-stabilized exterior paint, adhesive film or integral with the top sheet 1 or insulation 2.

The magenta color can be deep in value as in the color specified, or lighter in value with less magenta pigment, or blended with white pigment to reach a 'hot pink' tone. This blending is done to control the amount of the visible light spectrum required for the lighting requirements of the interior of the structure.

When only one sheet 1 of the corrugated glazing material as shown in FIGS. 1, 2, and 3 is used, the high summer sun rays 8 will also filter through this magenta-colored portion of the glazing system in addition to the rays that are reflected into the transparent portion from the top surface 30 of the magenta portion.

Figure 4:
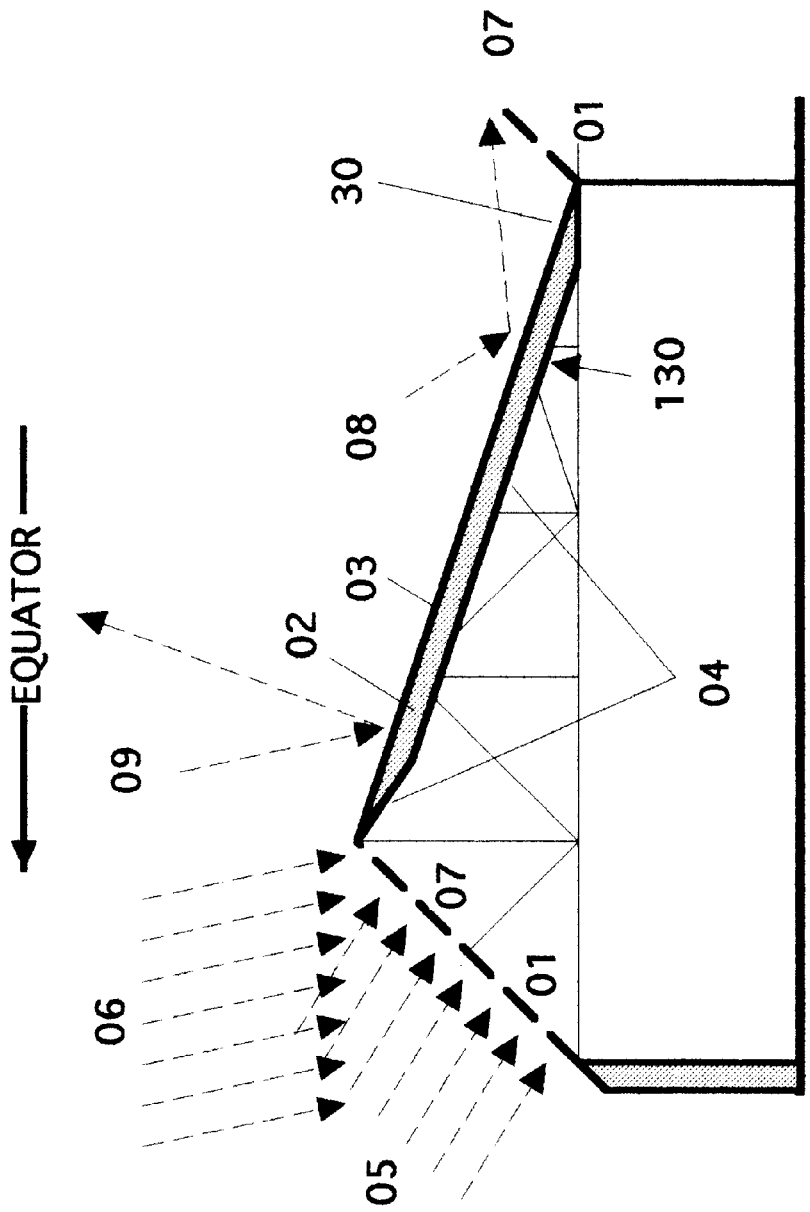
FIG. 4 is a north/south cross-section of a structure with a roofing system of the present invention.
Figure 5:
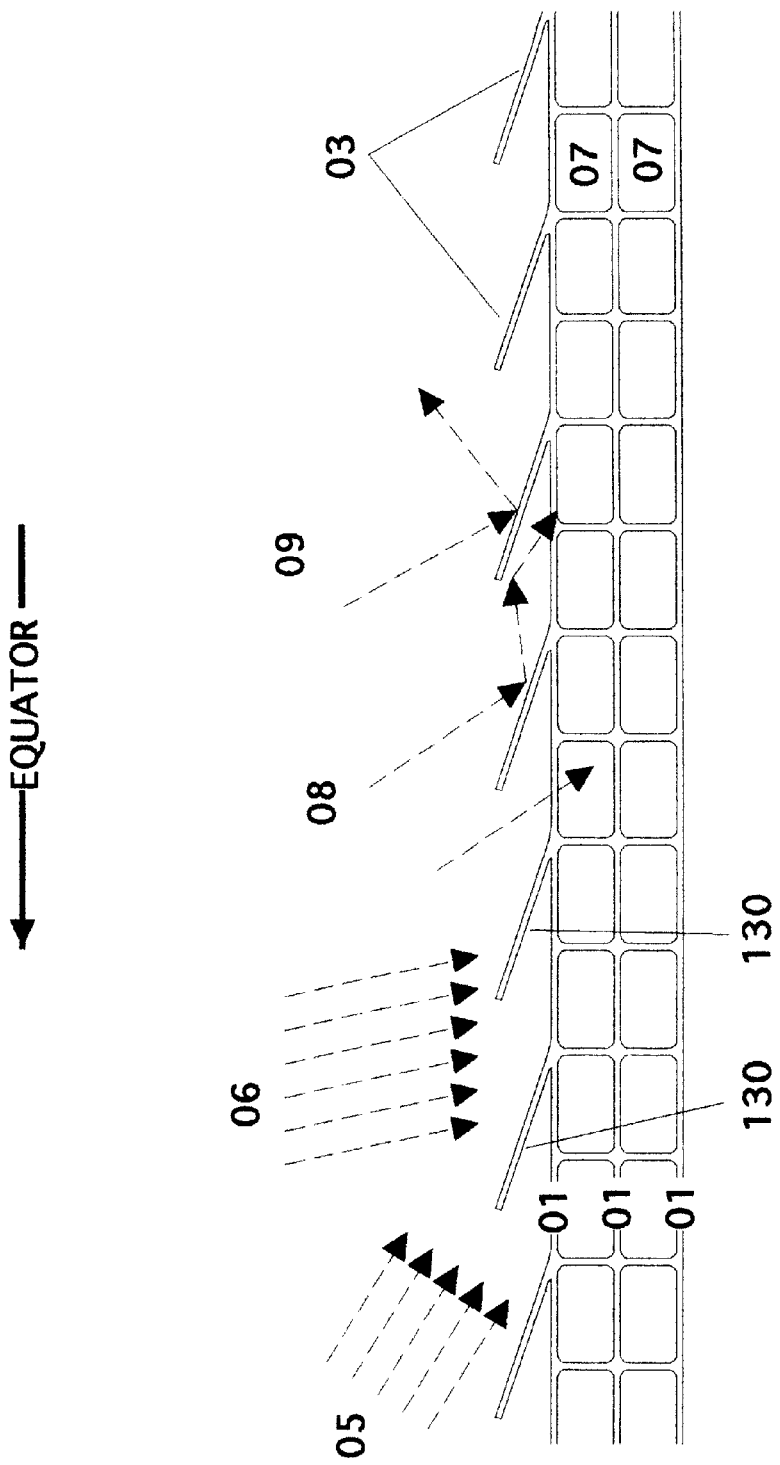
FIG. 5 is a perspective view of one embodiment of an integral louver system of the present invention.

FIG. 4 shows another embodiment of the present invention wherein the transparent glazing is diffusing glazing. The proportions and slopes of the glazed and magenta areas of the roof vary as required to satisfy the internal lighting, heating and cooling needs of the structure. The glazing in FIG. 4 can be single, double or triple and the insulation R-factor can be 38 or more if required. The insulation 2 shown in FIG. 4 should preferably be in the range of six to twelve inches thick with an R-factor of from 19 to 38 (U=0.053 to U=0.026 btu/square foot, degree Fahrenheit, hour). This configuration can also be proportioned to supply 'supersunlight' or more footcandles per unit area of growing than that of direct summer sunlight outside. The color spectrum can also be modified to optimize the photosynthetic needs of the plants or other uses within the structure. FIG. 5 shows triple glazing with integral louvers and FIG. 6 shows retrofit louvers with existing glazing.

In FIG. 4, the top surface 30 of the roof is magenta in color and glossy. As shown in FIG. 6, the top 30 of the louvers is magenta in color and glossy. As shown in FIG. 5, the integral louvers are magenta in color and glossy with the added possibility of being translucent to allow summer sunlight to pass filtered through the louvers.

As shown in FIGS. 1, 2, and 3, the interior surface 4 of the glazing sheet 1 below the insulation 2, or the bottom surface 4 of the bottom insulation 2, is coated gloss white or metallic reflective 130. This can be ultraviolet light-stabilized exterior paint, adhesive film or integral with the glazing or insulation. In FIG. 4, the ceiling underside material 4 of the roof system is gloss white or metallic reflective 130. This surface reflects radiant heat and light that comes from the interior of the greenhouse back down into the interior spaces. In FIG. 6, the two underside surfaces 4 of each louver are gloss white or metallic reflective.

It will be understood by one skilled in the art that the present system can be incorporated, or retrofit, into existing greenhouse roofing systems. For example, the glazing system depicted in FIGS. 1, 2, 3 and 6 can be used to reglaze existing commercial greenhouses that have their ridges and gutters running north/south without any major retrofit hardware required. Further, the retrofit louver system shown in FIG. 6 can be installed over existing corrugated or flat sheet glazing in buildings with the ridges and gutters running north/south.

The roof configuration shown in FIG. 4 can also be used in new or existing greenhouses that have the ridges and gutters running east/west. In this case, the north facing section of the roof is insulated, the outer face of the outer sheet colored glossy magenta and the inner face of the inner sheet colored glossy white or metallic reflective. The south facing section of the roof is glazed to receive light. The entering direct light is diffused so that the interior is lit more evenly. These systems, when used for new construction, can have higher or lower sloped.

Low angled winter sunlight 5 passes through the glazing as close to a normal angle as possible. This maximizes the sunlight that will enter into the interior spaces and minimizes the amount of sunlight that is reflected away from the structure. Virtually all the available winter sunlight 5 strikes the transparently-glazed portions 100 of the roof As shown in FIGS. 5 and 6 some of the low-angled winter sunlight 5 will first hit the underside of the louver and be reflected through the transparent glazing portions 100 at approximately normal angle. The portion of the sunlight that first strikes the horizontal glazing will partially pass through the glazing and partially be reflected onto the underside of the louver and then reflected through the transparent glazing into the building.

The fill spectrum summer sunlight 6 that passed into the structure is limited to the transparent portions 100 of the roof The amount of light and shading can be controlled by the width and slope of the insulation 2 and transparent portions 100 of the glazing and roof system The louvers of FIGS. 5 and 6 can be spaced to control the lighting required.

A portion of the high-angled summer sunlight 8 that strikes the magenta portions 110 of the present invention will be reflected into the structure through the transparent portions 100. The higher the sun angle, the more of the yellows and cyans are absorbed by the magenta and the more of the magenta-colored light is reflected into the structure. This maximizes the magenta color, which is used in photosynthesis being passed into the building in summer when the other colors would tend to produce unwanted summer heat in the building. Conversely, in the spring, fall and winter when the sun angle is lower, the rays 8 will strike the glossy magenta surfaces 3 below the critical angle and reflect virtually the fill color spectrum of light into the building so that the portion that is not used for photosynthesis will be changed to needed heat within the building.

This process of modifying the color of the entering light is naturally activated by the reoccurring winter, spring, summer, and fall sun angles. It could be said that the sun is the main moving part of the system, with the light and heat-gain controlled by rigid building parts. This reduces the maintenance associated with moving parts of light and heat systems that are a major factor in typical greenhouse structures.

A portion 9 of the high-angled summer sunlight strikes the more horizontal area of the magenta-colored portions 110 of the roof and is absorbed and reflected/radiated/convected away. In these cases, the heat is kept outside of the structure and, therefore, does not require mechanical devices and power to manage it.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. A roofing system for a greenhouse, the roofing system being subject to sunlight and capable of selectively managing the sunlight transmitted into and reflected away from the greenhouse, the roofing system comprising:

(a) at least one roofing sheet;

(b) at least one transparent portion of said sheet; and (c) at least one opaque portion of said sheet, said opaque portion capable of reflecting a portion of the sunlight striking said opaque portion into the greenhouse through said transparent portion;

wherein said roofing sheet has an outer and inner face;

wherein said transparent portion of said sheet allows sunlight to pass through said transparent portion and into the greenhouse; and wherein said opaque portion of said sheet includes a spectrum-absorbing coating on the outer face of said roofing sheet and a reflective coating on the inner face of said roofing sheet, said spectrum-absorbing coating absorbing a portion of the color spectrum of the sunlight that strikes said opaque portion not vital for photosynthesis.

2. The roofing system of claim 1, wherein said transparent portion includes a south facing section to allow entry of low-angled winter sunlight as normal to said roofing sheet as possible; and wherein said opaque portion includes a north facing section.

3. The roofing system of claim 2, wherein said transparent portion further comprises a gas space.

4. The roofing system of claim 3, wherein said opaque portion further comprises insulation.

5. The roofing system of claim 4, wherein said roofing sheet is a glazing sheet of sharp covered corrugated configuration.

6. The roofing system of claim 4, wherein said roofing sheet is a glazing sheet of round-bend corrugated configuration.

7. The roofing system of claim 5, wherein said gas space, and said insulation, each are between ¼" to ⅝" in thickness.

8. The roofing system of claim 1, wherein said system comprises a plurality of said roofing sheets;

wherein said roofing sheets are arranged one above another;

wherein the roofing sheet adapted to be exposed to the weather is the outer sheet and the roofing sheet adapted to be nearest the interior of the greenhouse is the inner sheet;

wherein each said roofing sheet has an outer and inner face;

wherein said transparent portion of said system includes a south facing section to allow entry of low-angled winter sunlight as normal to said roofing sheets as possible, and at least one gas space between each said roofing sheet; and wherein said opaque portion of said system includes a north facing section, a magenta coating on the outer face of said outer sheet, a reflective coating on the inner face of said inner sheet, and insulation between each said roofing sheet.

9. The roofing system of claim 8, wherein each said roofing sheet lies in a horizontal plane, each said plane parallel to each said other horizontal plane of each said other roofing sheet.

10. A roofing system for a greenhouse, the roofing system being subject to sunlight and capable of selectively managing the sunlight transmitted into and reflected away from the greenhouse, the roofing system comprising:

(a) at least one roofing sheet having an outer and inner face;

(b) at least one transparent portion of said sheet, said transparent portion including a section adapted to face the equator to allow entry of low-angled winter sunlight as normal to said section of said transparent portion as possible, said transparent portion allowing sunlight to pass therethrough and into the greenhouse; and (c) at least one opaque portion of said sheet, said opaque portion having a spectrum-absorbing coating on the outer face of said roofing sheet and a reflective coating on the inner face of said roofing sheet, said opaque portion including a section adapted to face opposite the equator, said section of said opaque portion capable of reflecting a portion of the color spectrum vital for photosynthesis into the greenhouse through said transparent portion.

11. The system of claim 10, wherein said spectrum-absorbing coating is selected from the group of coatings consisting of ultraviolet light-stabilized exterior paint and adhesive film.

12. The system of claim 10, wherein said spectrum-absorbing coating is magenta in color.

13. The system of claim 10, wherein said transparent portion further comprises a gas space.

14. The system of claim 13, wherein said opaque portion further comprises insulation.

15. The system of claim 14, wherein said roofing sheet is a glazing sheet having a sharp covered corrugated configuration.

16. The system of claim 14, wherein said roofing sheet is a glazing sheet having a round-bend corrugated configuration.

17. The system of claim 15, wherein said gas space, and said insulation, each are between ¼" to ⅝" in thickness.

18. The roofing system of claim 10 comprising a plurality of said roofing sheets, said roofing sheets being arranged one above another, said roofing sheet adapted to be exposed to the weather is the outer sheet and said roofing sheet adapted to be nearest the interior of the greenhouse is the inner sheet, each said roofing sheet having an outer and inner face and having a transparent portion and an opaque portion;

said transparent portion of each sheet including a section adapted to face the equator to allow entry of low-angled winter sunlight as normal to said section of said transparent portion as possible, and at least one gas space between each said roofing sheet; and said opaque portion of each sheet including a section adapted to face opposite the equator, a magenta-colored coating on the outer face of said outer sheet, an interior coating on the inner face of said inner sheet, and insulation between each said roofing sheet.

19. A roofing system for a greenhouse that selectively reflects unwanted sunlight away from the greenhouse, and transmits desired sunlight into the interior of the greenhouse, comprising:

(a) at least one roofing sheet, said roofing sheet having an outer and inner face;

(b) at least one transparent portion of said sheet, said transparent portion allowing sunlight to pass therethrough and into the greenhouse;

(c) at least one louver integral with said roofing sheet being exposed to the weather, said louver having a first section adapted to face opposite the equator, said first section having a top and bottom face, and having a spectrum-absorbing coating on the top face of said first section of said louver.

20. The roofing system of claim 19, said at least one louver further having at least one second section adapted to face the equator to allow entry of low-angled winter sunlight as normal to said at least one roofing sheet as possible, said second section having a top and bottom face, the bottom face of said second section facing the equator and having a reflective inner coating.

* * * * *

UNITED STATES PATENT AND TRADEMARK OFFICE
CERTIFICATE OF CORRECTION

PATENT NO  : 6,131,363
DATED      : October 17, 2000
INVENTOR(S): Phillips, Robert D.

It is certified that error appears in the above-identified patent and that said Letters Patent is hereby corrected as shown below:

On the title page, in the Abstract

Sentence beginning with "Since all of the light is taken in through..." replace "root" with --roof--;

Col. 3, line 3, replace "root" with --roof--; and
Col. 8, line 4, replace "sloped" with --slopes--.

Signed and Sealed this

Eighth Day of May, 2001

*Attest:*

NICHOLAS P. GODICI

*Attesting Officer*    *Acting Director of the United States Patent and Trademark Office*